(12) United States Patent
Awata et al.

(10) Patent No.: US 8,351,470 B2
(45) Date of Patent: Jan. 8, 2013

(54) SIGNAL RECEIVER, CONTROL METHOD OF SIGNAL RECEIVER, AND GPS DEVICE UTILIZING THE SIGNAL RECEIVER AND METHOD

(75) Inventors: Hideki Awata, Kanagawa (JP); Hideki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 341 days.

(21) Appl. No.: 12/795,312

(22) Filed: Jun. 7, 2010

(65) Prior Publication Data

US 2010/0329237 A1 Dec. 30, 2010

(30) Foreign Application Priority Data

Jun. 26, 2009 (JP) .................................. 2009-152472

(51) Int. Cl.
*H04J 1/02* (2006.01)
*H04B 1/00* (2006.01)
*G01S 19/00* (2010.01)
(52) U.S. Cl. ...................... 370/497; 375/150; 342/357.2
(58) Field of Classification Search .................. 370/316, 370/437, 480, 497; 342/357.2, 357.21, 357.22, 342/357.24; 375/150
See application file for complete search history.

(56) References Cited

U.S. PATENT DOCUMENTS

| 5,101,356 A | 3/1992 | Timothy et al. |
| 5,268,695 A | 12/1993 | Dentinger et al. |
| 2002/0167995 A1 | 11/2002 | Oesch et al. |

FOREIGN PATENT DOCUMENTS

WO   WO 94/08405 A1   4/1994

OTHER PUBLICATIONS

Bernhard Hoffmann-Wellehof, Herbert Lichtenegger, James Collings, "Global Positioning System", Section 2.2.1, pp. 14-15 (with partial English translation).
European Search Report dated Nov. 19, 2010 in corresponding European Application No. 10 16 3997.

*Primary Examiner* — Kerri Rose
(74) *Attorney, Agent, or Firm* — Oblon, Spivak, McClelland, Maier & Neustadt, L.L.P.

(57) ABSTRACT

A signal receiver including an input that receives a plurality of signals from a respective plurality of channels; a multiplexer unit that receives the plurality of signals from the input and that selects, in a time-division manner, one of the plurality of signals; and at least one phase difference detector that receives the selected signal from the multiplexer unit, a number of the at least one phase difference detectors being less than a number of the plurality of channels.

21 Claims, 6 Drawing Sheets

SIGNAL RECEIVER, CONTROL METHOD OF SIGNAL RECEIVER, AND GPS DEVICE UTILIZING THE SIGNAL RECEIVER AND METHOD

BACKGROUND OF THE INVENTION

1. Field of the Invention

The present invention relates to a signal receiver, a method of controlling the signal receiver, and a GPS device utilizing the signal receiver and method.

2. Description of the Related Art

Global Navigation Satellite Systems (GNSSs) for receiving signals from satellites orbiting the Earth and determining the current positions of the respective objects have been widely used. In particular, among the GNSS, Global Positioning Systems (GPSs) have been commonly known.

In practice, the GPS receiver is designed to obtain positional information by analyzing satellite waves received from a plurality of GPS satellites (for example, four or more satellites) via GPS antennas, calculate the current position of the GPS navigation system based on the positional information, and output the positional data denoting the current position to the navigation device. In other words, the GPS receiver receives signals from the respective satellites and demodulates the received signals to obtain the satellite orbit information. Then, the GPS receiver can derive the three-dimensional position of the GPS receiver using simultaneous equations from the GPS satellite's orbit and time information and the received signal's delay time. Any influence of a difference between the internal clock of the GPS receiver and the clock of the satellite can be removed by receiving signals from four or more GPS satellites.

In order to inform the user of the current position of the GPS receiver at every predetermined time interval (e.g., every one second), it is convenient to continuously track a signal from the GPS satellite. Generally, a signal to be used by the GPS receiver for positioning calculation is referred to as an L1 band C/A (Clear and Acquisition or Coarse and Acquisition) code. In other words, the signal is a GPS signal obtained by modulating a carrier of 1575.42 MHz with a binary phase shift keying (BPSK) scheme using a signal obtained by directly spreading data of 50 bps (bit per second) with a pseudo random noise (PRN) code having a code length of 1023 and a chip rate of 1.023 MHz. Therefore, synchronization of PRN codes, carriers, and data is desired to allow the GPS receiver to receive signals from the GPS satellites. A typical GPS receiver, which has been used in the art, uses a phase-locked loop (PLL) for GPS signal carrier synchronization and the number of PLLs should correspond to the number of signals to be received.

As mentioned above, to allow a typical GPS receiver to perform positioning calculation using signals from GPS satellites, it is desirable to receive the signals from four or more GPS satellites. Therefore, at least four independent PLLs are desirable. In the following description, GPS satellites having signals thereof that can be received at a particular area on the earth are referred to as visible satellites and the number of such satellites is referred to as the "number of visible satellites". The number of visible satellites is 10 or more in an open sky area but based on season, time, latitude, longitude, and terrain (see, for example, B. Hofmann-Wellenhof, H. Lichtenegger, and J. Collins "Global Positioning System: Theory and Practic", Springer-Verlag, Tokyo. 2005). If visible satellites can be simultaneously tracked as much as possible, the frequency that the number of the satellites from which signals is not more than four can be decreased even when a part of the receiving signals being tracked is blocked by buildings and geographic features. This results in a decrease in frequency of interrupting the positioning calculation due to a decrease in the number of receivable satellites. A component that performs synchronization-holding channel processing to receive one signal from one GPS satellite will be referred to as a "synchronization-holding channel" in the following description. Typically, in many cases, the GPS receiver may have eight or more synchronization-holding channels.

SUMMARY

A clock frequency to be supplied to the synchronization-holding channel, which is employed in many satellites, is in the range of 13 to 26 MHz to realize the synchronization-holding channel by hardware. On the other hand, the interval of processing carried out by the PLL in the synchronization-holding channel may be, for example, one time per millisecond (i.e., 1 KHz), which is a very small frequency compared with the aforementioned clock frequency. The processing to be carried out during the processing interval of the PLL only includes phase-difference calculation by a phase comparator and data-smoothing processing by a loop filter, so that such processing can be completed within almost 10 microseconds or less depending on the contents or scale of the processing.

Although the scale of the processing carried out during the interval of the processing carried out by the PLL is not so large, the typical GPS receiver includes phase comparators and loop filters, which are equal to the number of synchronization-holding channels. That means that an increase in the number of synchronization-holding channels leads to an increase in circuit size.

Therefore, it is desirable to provide a novel, improved signal receiver, a method for controlling the signal receiver, and a computer medium product for the signal receiver, where two or more synchronization-holding channels share one phase comparator and one loop filter to avoid an increase in circuit size due to an increase in number of synchronization-holding channels.

According to any embodiment of the present invention, one phase comparator and one loop filter are shared by a plurality of synchronization-holding channels. Therefore, a novel, improved signal receiver, a method of receiving a signal, and GPS device, which can prevent an increase in circuit side due to an increase in the number of synchronization-holding channels, can be realized.

DESCRIPTION OF EXEMPLARY EMBODIMENTS

Figure 1:
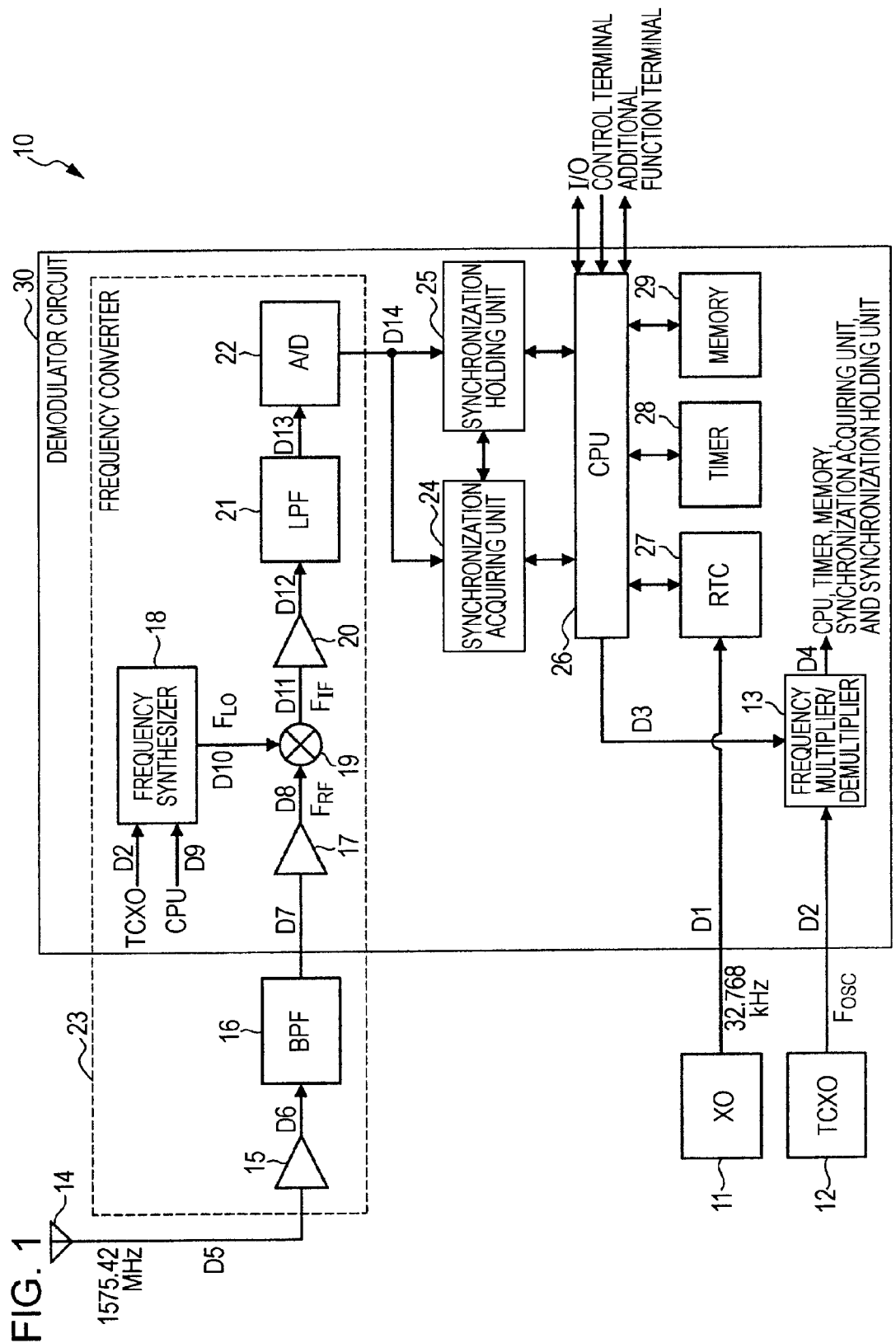
FIG. 1 is a diagram illustrating the configuration of a GPS receiver according to an embodiment of the present invention.

Hereinafter, preferred embodiments of the present invention will be described with reference to the attached drawings. In the following description and drawings, components having substantially the same functional configurations will be denoted by the same reference numerals, and thus detailed description thereof will be hereinafter omitted.

Explanation shall be given in following order:
<1. Exemplary embodiment>
[1-1. Configuration of receiver]
[1-2. Configuration of synchronization-holding channel]
[1-3. Configuration of typical PLL]
[1-4. Configuration of PLL of the present embodiment]
[1-5. Method of generating processing-start signal of phase difference detector and method of controlling counter]
<2. Conclusion>

1. EXEMPLARY EMBODIMENT

1-1. Configuration of Receiver

The configuration of a receiver according to an embodiment of the present invention, which is provided for receiving signals transmitted from at least four satellites in a global navigation satellite system (GNSS) and then calculates its position based on the received signals, will be described. The present embodiment assumes a global positioning system (GPS) widely used in Japan and a GPS receiver described below is an example of receivers corresponding to the GPS.

FIG. 1 is a diagram illustrating the configuration of the GPS receiver 10 according to the embodiment of the present invention. Hereinafter, the configuration of the GPS receiver 10 according to the embodiment of the present invention will be described with reference to FIG. 1.

The GPS receiver 10 shown in FIG. 1 receives signals from at least four or more global positioning systems (GPS) and then calculates its position based on the received signals. Specifically, the GPS receiver 10 shown in FIG. 1 receives a spread spectrum signal wave referred to as an L1 band C/A code as a reception signal. As shown in FIG. 1, when demodulating a reception signal being received, the GPS receiver 10 separates a function of acquiring synchronization between a spread code (PRN code) in a pseudo random (PRN) order generated by the GPS receiver itself and the PRN code of the reception signal from a function of retaining synchronization between the PRN code and a carrier wave (carrier). The separation of functions in this way can lead to speed up of synchronization acquisition while retaining the circuit size to be small in the GPS receiver 10. Needless to say, the present embodiment is not limited to the GPS receiver, such as described above.

Alternatively, the present embodiment is obviously applicable to a wide variety of receivers that receive signals transmitted from two or more satellites that constitute GNSS and calculate the position of the GPS receiver itself.

As shown in FIG. 1, the GPS receiver 10 includes a crystal oscillator (X'tal Oscillator; XO) 11 that generates a send signal D1 having a predetermined send frequency, a temperature compensated X'tal oscillator (TCXO) 12 that generates an oscillation signal D2 having a predetermined oscillation frequency $F_{osc}$ which is different from that of the XO 11, and a frequency multiplier/demultiplier 12 that multiplies and/or divides the oscillation signal D2 supplied from the TCXO 12.

The XO 11 generates an oscillation signal D4, such as one having a predetermined oscillating frequency of about 32.768 KHz. The XO 11 supplies the generated oscillation signal D1 to a real time clock (RTC) 27 as described later. The TCXO 12 generates a signal which is different from the one generated from the XO 11. For example, the TCXO 12 generates an oscillation signal D2 with a predetermined oscillating frequency $F_{osc}$ of about 16.368 MHz. The TCXO 12 supplies the generated oscillation signal D2 to the frequency multiplier/demultiplier 13 and a frequency synthesizer 18. The frequency multiplier/demultiplier 13 multiplies the oscillation signal D2 supplied from the TCXO 12 in response to a control signal D3 supplied from a central processing unit (CPU) 26 at a predetermined multiplication rate and/or demultiplies at a predetermined demultiplication rate. The frequency multiplier/demultiplier 13 supplies the oscillation signal. D4 being multiplied and/or demultiplied to a synchronization acquiring unit 24 described later, a synchronization-holding channel unit 25 described later, the CPU 26, a timer 28 described later, and a memory 29 described later.

In addition, the GPS receiver 10 includes an antenna 14 that receives radio frequency (RF) signals transmitted from GPS satellites, a low noise amplifier (LNA) 15 that amplifies an RF signal D5 received by the antenna 14, and a band pass filter (BPF) 16 that permits the passage of a predetermined frequency band component among the components of a RF signal D6 amplified by the LNA 15. The GPS receiver 10 also includes an amplifier 17 that further amplifies an amplified RF signal D7 passed through the BPF 16 and a frequency synthesizer 18 that generates a local oscillation signal D10 having a predetermined frequency $F_{LO}$ in response to the oscillation signal D2 supplied from the TCXO 12. In addition, the GPS receiver 10 includes a multiplier 19 that multiplies an amplified RF signal D8 having a predetermined frequency $F_{RF}$, which has been amplified by the amplifier 17, by the local oscillation signal D10 supplied from the frequency synthesizer 18. The GPS receiver 10 further includes an amplifier 20 that amplifies an intermediate frequency (IF) signal D11 having a predetermined frequency FIF, which has been down-converted by the multiplication with the multiplier 19. The GPS receiver 10 further includes a low pass filter (LPF) 21 that allows the passage of a predetermined frequency band component among components of an amplified IF signal D12 amplified by the amplifier 20. Furthermore, the GPS receiver 10 includes an analog/digital converter (A/D) 22 that converts an analog-format amplified IF signal D13 passed through the LPF 21 into a digital-format amplified IF signal D14.

The antenna 14 receives RF signals transmitted from the GPS satellites. For example, the antenna 14 may receive a spread spectrum RF signal with a frequency of 1575.42 MHz, which is transmitted from a GPS satellite. Then, the RF signal D5 received by the antenna 5 is supplied to the LNA 15.

The LNA 15 amplifies the RF signal D5 received by the antenna 14. The LNA 15 supplies an amplified RF signal D6 obtained by the amplification of the received RF signal D5 to the BPF 16.

The BPF 16 is a so-called surface acoustic wave (SAW) filter that allows a predetermined frequency band component among components of the RF signal D6 amplified by the LNA 15 to pass through the BPF 16. The amplified RF signal D7 passed through the BPF 16 is supplied to the amplifier 17.

The amplifier 17 further amplifies the amplified RF signal D7 passed through the BPF 16. Subsequently, the amplifier 17 supplies the further amplified RF signal D8 with a predetermined frequency $F_{RF}$ of 157.42 MHz to the multiplier 19.

The frequency synthesizer 18 generates a local oscillation signal D10 with a predetermined frequency $F_{LO}$ in response to the oscillation signal D2 supplied from the TCXO 12 under the control of a control signal D9 supplied from the CPU 26.

The frequency synthesizer 18 supplies the generated local oscillation signal D10 to the multiplier 19.

The multiplier 19 multiplies the amplified RF signal D8 having a predetermined frequency $F_{RF}$, which has been amplified by the amplifier 17, by the local oscillation signal D10 supplied from the frequency synthesizer 18 to down-convert the amplified RF signal D8. For example, the multiplier 19 generates an IF signal D11 with a predetermined frequency $F_{IF}$ of about 1.023 MHz. The IF signal D11 is then supplied to an amplifier 20.

The amplifier 20 amplifies the IF signal D11 down-converted by the multiplier 19. The amplifier 20 supplies an amplified IF signal D12 obtained by the amplification of the IF signal D11 to an LPF 21.

The LPF 21 allows passage of a component with a frequency lower than the predetermined frequency among components of the IF signal D12 amplified by the amplifier 20. An amplified IF signal D13 passed through the LPF 21 is then supplied to an A/D converter 22.

The A/D converter 22 converts the analog-type amplified IF signal D13 passed through the LPF 21 into a digital-type amplified IF signal D14. The amplified IF signal D14 converted by the A/D converter 22 is supplied to the synchronization acquiring unit 24 and the synchronization-holding channel unit 25.

Furthermore, among the above structural components of the GPS receiver 10, the LNA 15, the amplifiers 17 and 20, the BPF 16, the frequency synthesizer 18, the multiplier 29, the LPF 21, and the A/D converter 22 form a frequency converter 23. Here, for example, the frequency converter 23 may down-convert the received RF signal D5 with a high frequency of 1575.42 MHz, which has been received by the antenna 14, into the amplified IF signal D14 with a low frequency $F_{IF}$ of about 1.023 MHz so as to easily carry out. digital-signal processing.

Furthermore, the GPS receiver 10 includes a synchronization acquiring unit 24 that acquires synchronization between the PRN code generated by the GPS receiver 10 itself and the PRN code of the amplified IF signal D14 supplied from the A/D converter 22 and detects the carrier frequency of the amplified IF signal D14. In addition, the GPS receiver 10 also includes a synchronization-holding channel unit 25 that holds the synchronization between the PRN code and the PRN code of the amplified IF signal D14 supplied from the A/D converter 22 and modulates a message. The GPS receiver 10 further includes a CPU 26 that performs various kinds of arithmetic processing by integrally controlling the respective components. Moreover, the GPS receiver 10 includes a real time clock (RTC) 27 that measures the time based on the oscillation signal D1 supplied from the XO 11, a timer 28 as an internal clock of the CPU 26, and a memory 29, such as a random access memory (RAM) and a read only memory (ROM).

The synchronization acquiring unit 24 performs synchronization acquisition of the PRN code of the amplified IF signal D14 supplied from the A/D converter 22 on the basis of the multiplied and/or demultiplied oscillation signal D4 supplied from the frequency multiplier/demultiplier 13 under the control of the CPU 26. In addition, the synchronization acquiring unit 24 detects a carrier frequency of the amplification IF signal D14. When performing the synchronization acquisition of the PRN code and the detection of the carrier frequency, the synchronization acquiring unit 24 performs the synchronization acquisition with coarse accuracy. Furthermore, the synchronization acquisition in the synchronization acquiring unit 24 may be performed using any structural component, such as a sliding correlator or a matched filter.

The synchronization acquiring unit 24 supplies: a satellite number for identifying the detected GPS satellite; the phase of the PRN code; and the carrier frequency to the synchronization-holding channel unit 25 and the CPU 26.

The synchronization-holding channel unit 25 performs synchronization acquisition of the PRN code of the amplified IF signal D14 supplied from the A/D converter 22 on the basis of the multiplied and/or demultiplied oscillation signal D4 supplied from the frequency multiplier/demultiplier 13 under the control of the CPU 26. In addition, the synchronization-holding channel unit 25 decodes a navigation message in the amplified IF signal D14. When holding the synchronization between the PRN code and the carrier and decoding a navigation message, the synchronization-holding channel unit 25 starts its operation using the satellite number, the phase of the PRN code, and the carrier frequency as initial values. The synchronization holding unit 25 performs synchronization-holding processing for amplified IF signals D14 from a plurality of GPS satellites in parallel and then supplies the detected phase of the PRN code, the carrier frequency, and the navigation message.

The CPU 26 acquires the phase of the PRN code, the carrier frequency, and the navigation message supplied from the synchronization-holding channel unit 25. Based on those kinds of information, the CPU 26 performs various kinds of arithmetic processing, such as a process of calculating a three-dimensional position of the CPU 26 itself and a process of correcting the time information of the corresponding GPS receiver 10. In addition, the CPU 26 performs controls of each part of the corresponding GPS receiver 10 and various kinds of peripherals (peripheral devices) and external input/output (I/O) terminals.

The RTC 27 measures the time based on the oscillation signal D1 supplied from the XO 11. The information of the time measured by the RTC 27 serves as a substitute until the correct time information of the GPS satellite is obtained. When the correct time information of the GPS satellite is obtained, then the CPU 26 controls the XO 11 to appropriately correct the time information.

The timer 28 functions as an internal clock of the CPU 26 and is used for generation of various timing signals and time standards for operations of the respective structural, components. For instance, in the GPS receiver 10, the timer 28 generates a timing of initiating the operation of a PRN code generator in the synchronization holding unit 25 in synchronization with the phase of the PRN code synchronously acquired by the synchronization acquiring unit 24.

The memory 29 may be a random access memory (RAM) or a read only memory (ROM). In the memory 29, the RAM may be used as a work area for carrying out various kinds of processing by the CPU 26 or the like. The RAM may be used for buffering various kinds of input data and holding intermediate data, ephemeris and almanac data such as the satellite's orbit information obtained by the synchronization-holding channel unit, and intermediate data and arithmetic result data generated during the processing. In addition, the memory 29 may be a ROM for storing various kinds of programs and fixed data. In addition, the memory 29 may be a nonvolatile memory for storing ephemeris and almanac data such as the satellite's orbit information, positional information and the positional information of the positioning result, an error amount of TCXO 12, and so on even when the electric power of the GPS receiver 10 is turned off.

In the GPS receiver 10, the synchronization acquiring unit 24, the synchronization-holding channel unit 25, the CPU 26, the RTC 27, the timer 28, and the memory 29 form a baseband processing section. In the GPS receiver 10 having each of these components, a demodulator circuit 30 provided as an integrated single circuit is constructed of the components except for at least the XO 11, the TCXO 12, the antenna 14, the LNA 15, and the BPF 16.

The GPS receiver 10 receives RF signals from at least four GPS satellites and the RF signals are then converted into IF signals by the frequency converter 23. Subsequently, the synchronization acquiring unit 24 performs the synchronization acquisition of PRN codes and the detection of carrier frequencies. The synchronization-holding channel unit 25 performs synchronous holding of PRN codes and carriers and the demodulation of a navigation message. Subsequently, the GPS receiver 10 calculates its three dimensional position by the CPU 26 based on the phase of the PRN code, the carrier frequency, and the navigation message.

In the above description, the configuration of the GPS receiver 10 according to the embodiment of the present invention has been described with reference to FIG. 1. Alternatively, the GPS receiver 10 may have another configuration different from the one shown in FIG. 1 and may include a memory unit which is capable of storing various kinds of data, such as display data for a user interface, and applications, an operation unit which is operable by the user, and a display unit for displaying information of the present position, or the like. In the above GPS receiver 10, for example, the above structural components may be connected to one another via a bus that serves as a data transmission line.

As described above, the synchronization-holding channel unit 25 under the controls of the CPU 26 performs synchronization holding between the PRN code and the carrier of the amplified IF signal D14 supplied from the A/D converter 22 and the carrier on the basis of the multiplied and/or demultiplied oscillation signal D4 supplied from the frequency multiplier/demultiplier 13, while the demodulation of a navigation message contained in the amplification IF signal D14 is performed.

The synchronization holding unit 25 performs synchronization holding processing for amplified IF signals D14 from a plurality of GPS satellites in parallel and then supplies the detected phase of the PRN code, the carrier frequency, and the navigation message to the CPU 26. Subsequently, the configuration of a section where the synchronization holding of specific GPS satellite signals with respect to the amplified IF signals D14 from a plurality of GPS signals (hereinafter, referred to as a synchronization-holding channel) will be described.

1-2. Configuration of Synchronization-Holding Channel

Figure 2:
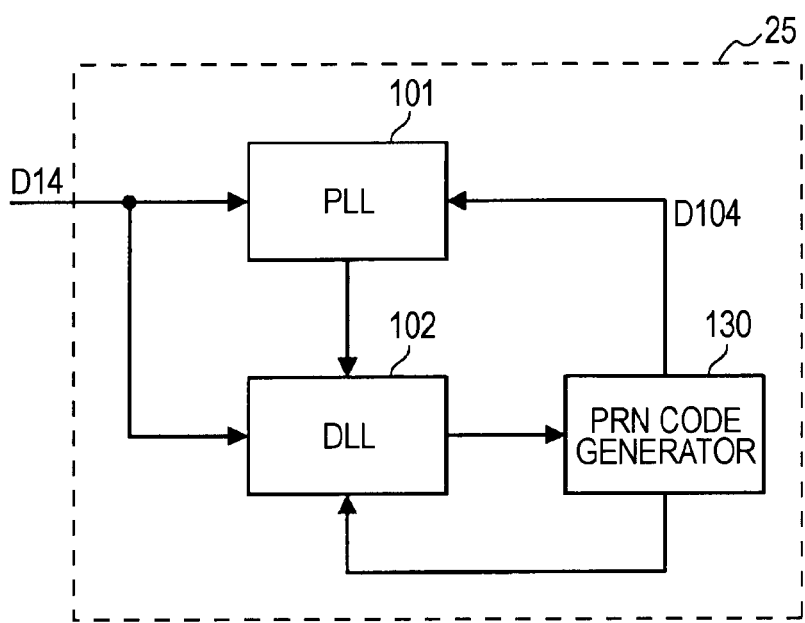
FIG. 2 is a diagram illustrating the configuration of a synchronization-holding channel in the GPS receiver according to the embodiment of the present invention.

FIG. 2 is a diagram illustrating the configuration of the synchronization-holding unit 25 in the GPS receiver 10 according to an embodiment of the present invention. Referring now to FIG. 2, in the following description, the configuration of the synchronization-holding unit 25 in the GPS receiver according to the embodiment of the present invention will be described.

The synchronization holding performs holding of specific GPS satellite signals from the amplified IF signals D14 from a plurality of GPS signals (hereinafter, referred to as a synchronization-holding channel). The synchronization-holding unit 25 includes a phase-locked loop (PLL) 101 that performs the synchronization-holding on a channel of carriers, a delay-locked loop (DLL) 102 that performs synchronization-holding on a channel of PRN codes, and a PRN code generator 130 that generates PRN codes of specific GPS satellites specified by the CPU 26.

The PLL 101 performs synchronization-holding on a channel of carriers of specific GPS satellite signals from the amplified IF signals D14 from a plurality of GPS satellites, followed by outputting the carrier frequency of the GPS satellite being tracked. The carrier frequency thus obtained is supplied to the DLL 102 and also used for positioning calculation via the CPU 26. In addition, the PLL 101 also performs the extraction of a navigation message and the extracted navigation message is then supplied to the CPU 26.

The DLL 102 performs synchronization-holding on a channel of PRN signals of specific GPS satellite signals from the amplified IF signals D14 from a plurality of GPS satellites, followed by outputting the phase of the PRN code and the frequency of the GPS satellite being tracked. The phase of the PRN code thus obtained in the DLL 102 is supplied to the PLL 101 and also used for positioning calculation via the CPU 26. In addition, the PRN code frequency thus obtained is supplied to the PRN code generator 130.

The PRN code generator 130 generates a PRN code corresponding to the PRN code frequency obtained from the DLL 102. The type of the PRN code being generated depends on the kind of the GPS satellite to be synchronized and is provided from the CPU 26.

In the above description, the configuration of the synchronization-holding unit 25 in the GPS receiver 10 according to the first embodiment of the present invention has been described. Next, the configuration of the PLL 101 used in the synchronization-holding channel 100 shown in FIG. 2 will be described after description of an exemplified configuration of the PLL used in the synchronization-holding channel of the typical GPS receiver.

1-3. Configuration of Typical PLL

Figure 3:
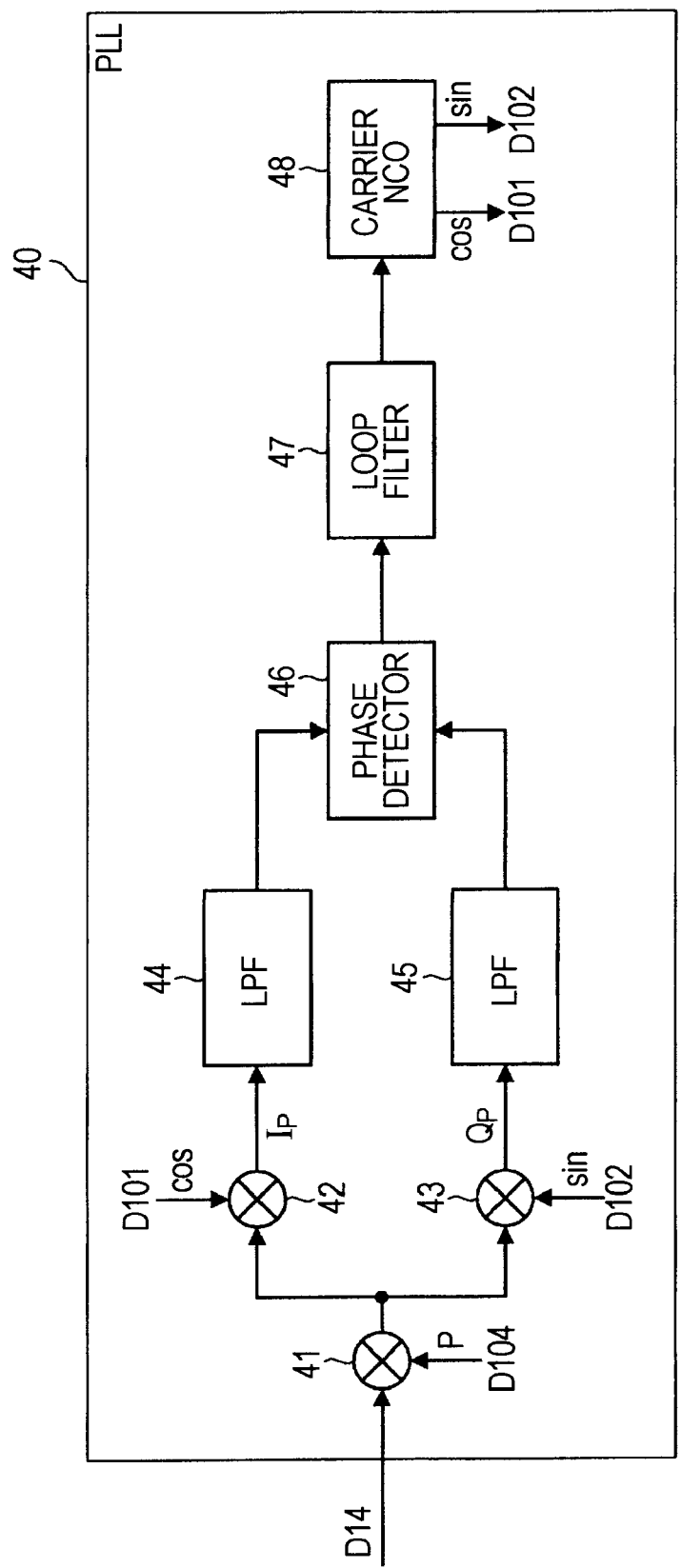
FIG. 3 is a diagram illustrating the configuration of a PLL used in a synchronization-holding channel of a background GPS receiver which has been used in the art.

FIG. 3 is a diagram illustrating the configuration of a PLL 40 used in the synchronization-holding channel of a background GPS receiver which has been used in the art. As shown in FIG. 3, the PLL 40 used in the synchronization-holding channel of the background GPS receiver includes: mixers 41, 42, and 43; LPFs 44 and 45; a phase detector 46; a loop filter 47; and a carrier numeral controlled oscillator (NCO) 48. Then, the number of PLLs 40 shown in FIG. 3 included in the GPS receiver is equal to the number of synchronization-holding channels.

A mixer 41 is provided for removing (or reverse-spreading) a PRN code of the specific GPS satellite signal in an amplified IF signal D14 supplied from the A/D converter 22. The amplified IF signal D14 is multiplied by a delay (prompt or punctual) signal D104 of the PRN code output from the PRN code generator 130. The signal reverse-spread by the mixer 41 is then supplied to mixers 42 and 43.

The mixer 42 multiplies the output of the mixer 41 by a cos component output from a carrier NCO 48 to take out an in-phase component (I component) of the specific GPS satellite signal from the output of the mixer 41. As a result, the I component $I_p$ includes the sum and difference between the carrier frequency of the GPS satellite signal being tracked and the frequency of carrier generated from the NCO 48. The I component $I_p$ obtained in the mixer 42 is then supplied to the LPF 44.

To take out an orthogonal component (quadrature-phase; Q component) $Q_p$ of the carrier of the specific GPS satellite signal from the output of the mixer 41, the output of the mixer 41 is multiplied by a sin component output from the NCO 48. As a result, the Q component $Q_p$ includes the sum and difference between the carrier frequency of the GPS satellite signal being tracked and the frequency of carrier generated from the NCO 48. The Q component $Q_p$ is supplied to the LPF 45.

The LPFs 44 and 45 take out the frequency difference among the sum and difference between two frequency components in the outputs of the respective mixers 42 and 43 from the carrier frequency of the GPS satellite signal being tracked and the carrier frequency generated from the NCO 48. Each of the LPFs 44 and 45 has a role of removing noises. An output of each of the LPFs 44 and 45 is supplied to a phase detector 46.

A phase detector 46 calculates a phase difference between the carrier of the GPS satellite signal being tracked and the carrier generated from the NCO 48 from the I component $I_p$ and the Q component $Q_p$ passed through the LPFs 44 and 45, respectively. The phase difference obtained by the phase detector 46 is then supplied to a loop filter 47.

The loop filter 47 is a kind of LPF for realizing a desired loop response while removing an unnecessary noise from the phase difference information generated by phase detector 46. The CPU 26 provides the loop filter 47 with proper parameters for the desired loop response. An output from the loop filter 47 is supplied to the carrier NCO 48.

The carrier NCO 48 generates a carrier signal corresponding to frequency according to an input. The carrier NCO 48 then outputs a carrier signal D101 used as a standard and a signal D102 with a phase shift of 90 degrees therefrom. From the carrier NCO 48, the output signal D101 is supplied to the mixer 42 and the output signal D102 to the mixer 48.

In the above description, the configuration of the PLL 40 used in the synchronization-holding channel of the typical GPS receiver has been described. As described above, such a typical GPS receiver is provided with one PLL for every synchronization-holding channel. Therefore, both the phase detector 46 and the loop filter 47 are needed for each synchronization-holding channel, and the number of needed phase detectors 46 and loop filters 47 is equal to the number of the synchronization-holding channels. Thus, as described above, in the typical GPS receiver, an increase in circuit size may occur because of needing the same number of phase detectors and the loop filters as the number of the synchronization-holding channels even if a scale of processing to be carried out during the interval of processing of the PLL is not so large.

Here, in the GPS receiver according to the embodiment of the present invention, a plurality of synchronization-holding channels share a phase comparator and a loop filter of a PLL and processing is carried out with time sharing, which prevents a desired circuit size from being increased, as now described.

1-4. Configuration of PLL of the Present Exemplary Embodiment

Figure 4:
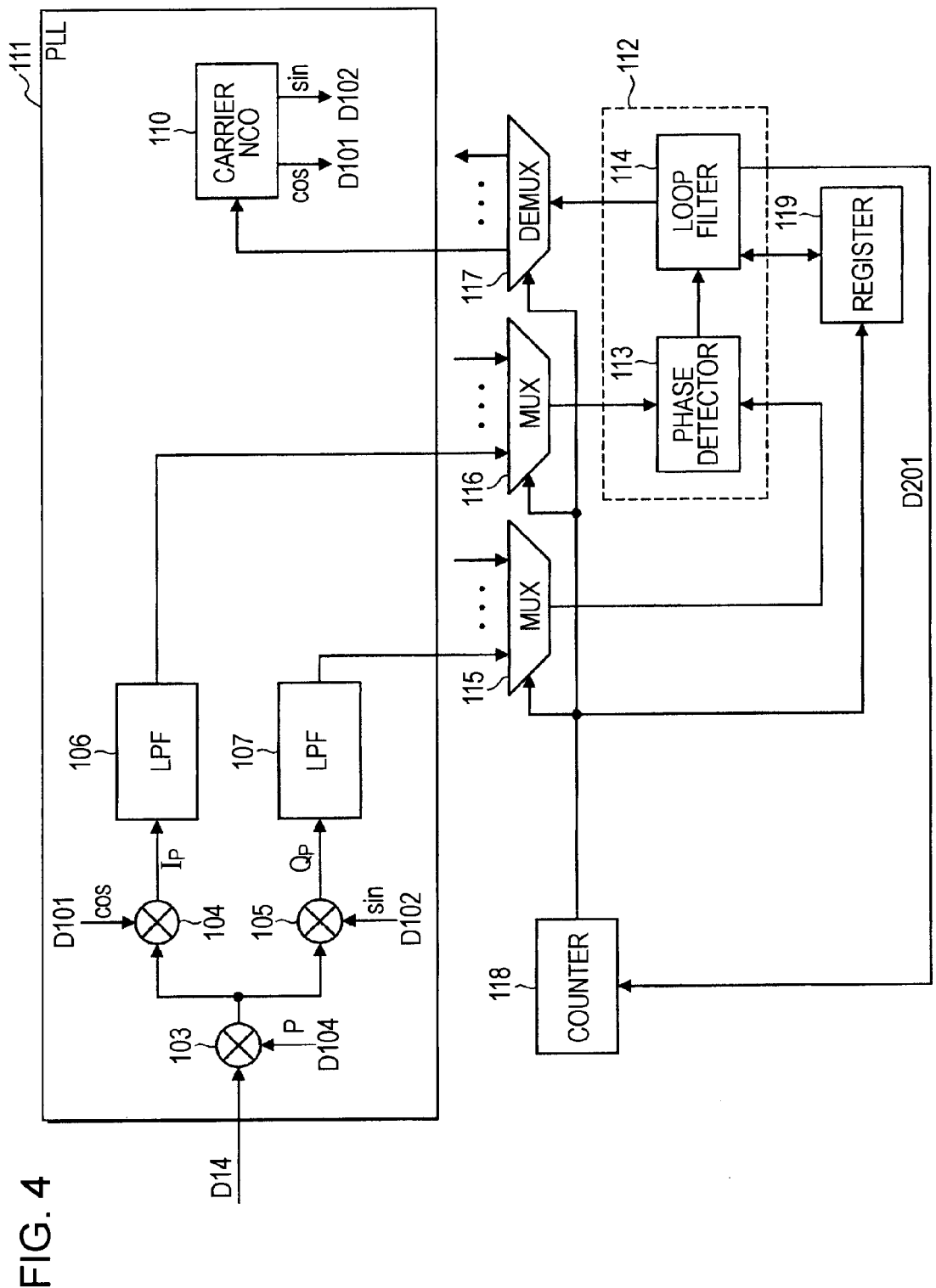
FIG. 4 is a diagram illustrating the configuration of PLL in a synchronization-holding channel according to one embodiment of the present invention.

FIG. 4 is a diagram illustrating the configuration of PLL 111 in a synchronization-holding unit 25 according to one of exemplary embodiments of the present invention. Referring now to FIG. 4, the configuration of the PLL 111 used in the synchronization-holding unit 25 according to the embodiment of the present invention will be described.

As shown in FIG. 4, the PLL 111 includes: a mixer 103 that eliminates a PRN code of a specific GPS satellite signal in an amplified IF signal D14 supplied from the A/D converter 22; a mixer 104 that takes out an I component $I_p$ of the carrier of the specific GPS satellite signal; a mixer 105 that takes out a Q component $Q_p$ of the carrier of the specific GPS satellite signal; and LPFs 106 and 107 that eliminate an undesired frequency component, such as a noise, caused by band limitation. In addition, the PLL 111 also includes: a phase detector 113 that detects a phase difference between a carrier in a received GPS satellite signal and a carrier generated from a carrier numerically controlled oscillator (carrier NCO) 110 with reference to the ratio between the I component $I_p$ and the Q component $Q_p$; and a loop filter 114 that smoothes a phase difference output from the phase detector 113. In addition, the PLL 111 also includes: a carrier NCO 110 that eliminates a carrier of a GPS satellite signal being tracked; a multiplexer (MUX) 116 that selects an I signal connected to the phase detector 113 among I signals from a plurality of channels; and a multiplexer (MUX) 115 that selects a Q signal connected to the phase detector 113 among Q signals from a plurality of channels. Furthermore, the PLL 111 includes: a demultiplexer (DEMUX) 117 that selects a carrier NCO 110 connected to a loop filter 114 among the carrier NCOs 110 from a plurality of channels; and a counter 118 that holds which channel signal the multiplexers 115 and 116 and the demultiplexer 117 should select. Moreover, the PLL 111 includes a register 119 that holds an intermediate result, which is generated in the loop filter, for each of plural channels.

The mixers 103, 104, and 105, the LPFs 106 and 107, and the carrier NCO 110 are provided in an equal number to the number of the synchronization-holding channels, respectively. In contrast, the needed numbers of the phase detector 113, the loop filter 114, the counter 118, the register 119, the multiplexers 115 and 116, and the demultiplexer 117 is less than the number of the synchronization-holding channels. Here, a significant improvement in efficiency is realized in the relationship between the number of synchronization-holding channels and the number of the phase difference detectors 112 each including the phase detector 113 and the loop filter 114.

In the present embodiment, the number M of the needed phase difference detectors 112 is determined so that it will be less than the number N (N≧2) of the synchronization-holding channels (N>M). Now, how to determine M when N is given concretely will be described. First, the maximum number L of sharable synchronization-holding channels for one phase difference detector 112 is calculated. If a time for processing in the phase detector is defined as $T_1$ and the interval of processing of the PLL is defined as $T_0$, then the maximum number L of the sharable synchronization-holding channels for one phase difference detector 112 is determined so that the maximum number L will satisfy the following equation (1):

$$L = \left\lfloor \frac{T_0}{T_1} \right\rfloor, \quad \text{(Equation 1)}$$

wherein $\lfloor \ \rfloor$ indicates a floor function symbol in which $\lfloor x \rfloor$ is the maximum integer that does not exceed x.

For example, if $T_0$=1 ms and $T_1$=15 μs, then M satisfies the following equation (2):

$$M = \left\lceil \frac{N}{L} \right\rceil, \quad \text{(Equation 2)}$$

wherein $\lceil \ \rceil$ indicates a ceiling function symbol in which $\lceil X \rceil$ is the minimum integer that does not exceed x.

For example, if N=20 and L=67, then M=1. If N=20 and L=15, then M=2.

Here, in the following description, for the sake of a simplified explanation, the number N of the synchronization-holding channels is set to eight (8), the number M of the phase difference detectors 112 is set to one (1). However, the number may be larger or smaller as long as it satisfies the aforementioned conditions.

A mixer 103 is provided for removing (or reverse-spreading) a PRN code of the specific GPS satellite signal in an amplified IF signal D14 supplied from the A/D converter 22. The amplified IF signal D14 is multiplied by a prompt; or punctual signal of the PRN code output from the PRN code generator 130. The signal reverse-spread by the mixer 103 is then supplied to mixers 104 and 105.

The mixer 104 multiplies the output of the mixer 103 by a cos component output from a carrier NCO 110 to take out an I component $I_p$ of the specific GPS satellite signal from the output of the mixer 104. As a result, the I component $I_p$ includes the sum and difference between the carrier frequency of the GPS satellite signal being tracked and the frequency of carrier generated from the NCO 110. The I component $I_p$ taken out by the mixer 104 is then supplied to the LPF 106.

The mixer 105 multiplies the output of the mixer 103 by a sin component output from a carrier NCO 110 to take out a Q component $Q_p$ of the specific GPS satellite signal from the output of the mixer 103. As a result, the Q ingredient $Q_p$ includes the sum and difference between the carrier frequency of the GPS satellite signal being tracked and the frequency of carrier generated from the NCO 110. The Q component $Q_p$ taken out by the mixer 105 is then supplied to the LPF 107.

The LPFs 106 and 107 filter out the frequency difference among the sum and difference between two frequency components in the outputs of the respective mixers 104 and 105 from the carrier frequency of the GPS satellite signal being tracked and the carrier frequency generated from the NCO 110. Each of the LPFs 106 and 107 has a role of removing noises. An output of each of the LPFs 106 and 107 is supplied to a phase detector 113 through multiplexers 115 and 116 described later, respectively.

A phase detector 113 calculates a phase difference between the carrier of the GPS satellite signal being tracked and the carrier generated from the NCO 48 from the I component $I_p$ and the Q component $Q_p$ passed through the LPFs 44 and 45, respectively. The phase difference information obtained by the phase detector 113 is then supplied to a loop filter 114.

The loop filter 114 is a kind of LPF for realizing a desired loop response while removing an unnecessary noise from the phase difference information generated by phase detector 113. The CPU 26 provides the loop filter 114 with proper parameters for the desired loop response. An output from the loop filter 114 is supplied to the carrier NCO 110 through the demultiplexer 117 described later.

The carrier NCO 110 generates a carrier signal corresponding to frequency according to an input. The carrier NCO 110 then outputs a carrier signal D101 used as a standard and a signal D102 with a phase shift of 90 degrees therefrom. From the carrier NCO 110, the output signal D101 is supplied to the mixer 104 and the output signal D102 is supplied to the mixer 105.

Each of the multiplexers 115 and 116 is provided for selecting an output from a specific synchronization-holding channel among outputs from the LPF 106 and 107 of a plurality of synchronization-holding channels. The synchronization-holding channel to be selected is held in the counter 118. From the carrier NCOs 110 of plural synchronization-holding channels, the demultiplexer 117 is provided for selecting a channel to be connected to the loop filter 114. The information of the synchronization-holding channel to be selected is held as a channel number in the counter 118.

The counter 118 holds the channel number for selecting the signal of the specific synchronization-holding channel among the signals of plural synchronization-holding channels by the multiplexers 115 and 116 and the demultiplexer 117. In the present embodiment, the channel numbers 0 to 7 are held as the number of the synchronization-holding channels is equal to eight. A method of controlling the counter value of the counter 118 will be described later.

The register 119 is a space for storing the intermediate result generated from the loop filter 114. The register 119 may be realized using a flip-flop or RAM but is not limited thereto. The intermediate results generated by the loop filter 114 differ for every synchronization-holding channel. Thus, the register 119 desires to prepare an available storage space corresponding to the number of synchronization-holding channels. The counter 118 specifies to which channel region in the register 119 the intermediate result is stored in or to which channel region the intermediate result to be used a next time is taken out from.

The signal D201 is a signal that represents the end of the calculation of the loop filter 114 and initiates the phase difference detection for the next synchronization-holding channel, which processing is to be carried out by the phase detector 113 and the loop filter 114. Simultaneously, the signal D201 is a signal for updating the counter 118.

In the above description, the configuration of the PLL 111 has been described with reference to FIG. 4. In the typical method which has been used in the art, the phase difference detectors 112 installed in the respective synchronization-holding channel are started simultaneously by a process start signal generated by the frequency multiplier/demultiplier 12 shown in FIG. 1. In the present embodiment, one phase difference detector 112 takes charge of the processing of a plurality of synchronization-holding channels with time sharing. Thus, a signal for starting the processing of the phase difference detector 112 is used in addition to the processing-start signal generated by the frequency multiplier/demultiplier 13. In the following description, a method of generating a processing-start signal of the phase difference detector 112 and a method of controlling the counter 118 in accordance with the present embodiment will be described.

Figure 5:
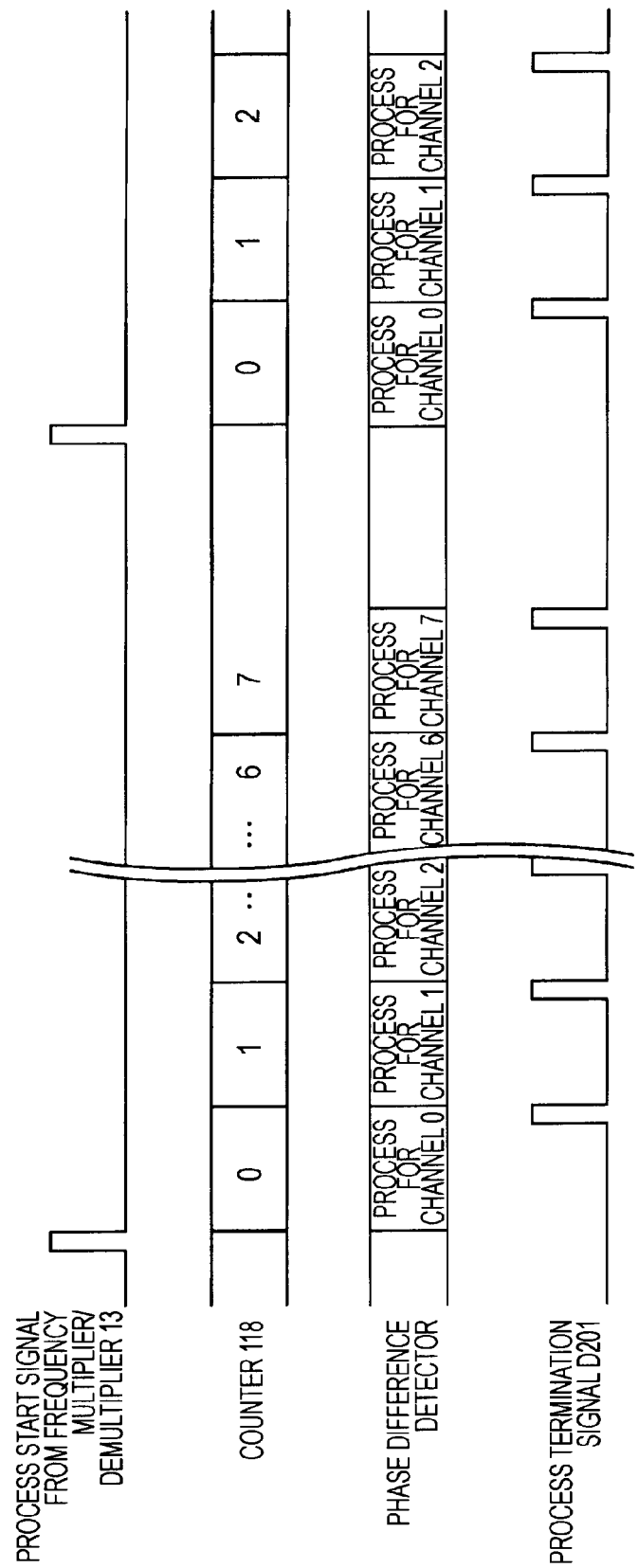
FIG. 5 is a diagram schematically illustrating a method of generating a processing-start signal of a phase difference detector according to one of embodiments of the present invention.

1-5. Method of Generating Processing-Start Signal of Phase Difference Detector and Method of Controlling Counter FIG. 5 is a diagram schematically illustrating a method of generating a processing-start signal of the phase difference detector 112 according to one of the embodiments of the present invention. Hereinafter, referring to FIG. 5, the method of generating a processing-start signal of the phase difference detector 112 according to the embodiment will be described.

If it is assumed that the synchronization-holding channels to be processed are sequentially processed in order from the number 0 to 7, then a process start signal generated by the frequency multiplier/demultiplier 13 is utilized as a start signal for processing the channel 0 (zero). On the other hand, the process start signals for processing the channels 1 to 7 utilize a process termination signal D201 of the loop filter 114. However, the process termination signal of the last channel (channel 7 in the example shown in FIG. 5) is no longer a channel to be processed. Thus, it is not utilized as a process start signal. As described above, the counter 118 is responsible for determining a synchronization-holding channel to be connected to the multiplexers 115 and 116 and the demultiplexer 117. In addition, the counter 118 is also responsible for determining a storage space in the register 119 for the intermediate result generated by the loop filter 114 and a storage location in the register 119 for the intermediate result used by the loop filter 114. Basically, the same control as that of the process start signal as described above is performed. In other words, the counter 118 is initialized to zero (0) using a process start signal generated by the frequency multiplier/demultiplexer 13 shown in FIG. 1 and then the counter value of the counter is added with one (1) using a process terminator signal D201 of the loop filter 114. However, the counter 118 does not perform any addition of counter value if the counter already holds the maximum channel number (in this example, 7).

Figure 6:
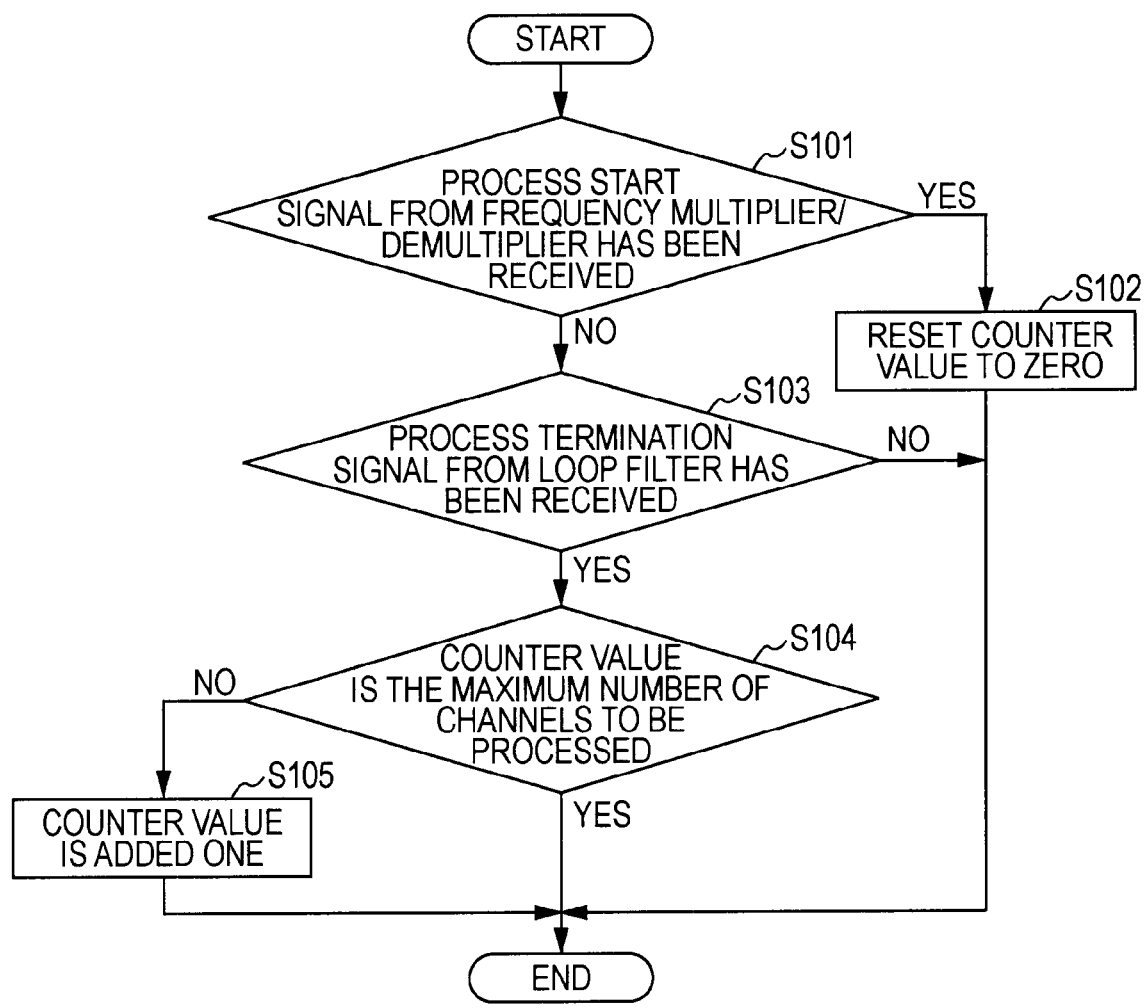
FIG. 6 is a flow chart illustrating a method of controlling a counter in a PLL according to one embodiment of the present invention.

FIG. 6 is a flow chart showing a method of controlling the counter 118 in the PLL 111 according to one of the embodiments of the present invention. In the following description, the method of controlling the counter 118 in the PLL 111 of the present embodiment will be described with reference to FIG. 6. For example, a series of steps shown in FIG. 6 may be performed by the CPU 26.

First, it is determined whether the counter 118 has received a process start signal from the frequency multiplier/demultiplier 13 (Step S101). As a result of the determination in the step S101, if there is a process start signal received from the frequency multiplier/demultiplier 13, then the counter value of the counter 118 is initialized to zero (0) (Step S102) and the process is ended. On the other hand, as a result of the determination in the step S101, if there is no process start signal from the frequency multiplier/demultiplier 13, then it is determined whether the counter 118 has received a process termination signal from the loop filter 114 (Step S103).

As a result of the determination in the step S103, if there is a process termination signal received from the loop filter 114, then it is continuously determined whether the counter value of the counter 118 has reached the maximum number of channels to be processed (Step S104). On the other hand, as a result of the determination in the above step S103, if there is no process termination signal from the loop filter 114, then the process is ended as it is.

As a result of the determination in the above step S104, if it is determined that the counter value of the counter 118 does not reach the maximum number of channels to be processed, then the counter value of the counter 118 is added with one (1) (Step S105). On the other hand, as a result of the determination in the above step S104, if it is determined that the counter value of the counter 118 has reached the maximum number of channels to be processed, then the process is ended as it is. Furthermore, the process further proceeds to carry out the processing in the above step S101 again, where it is determined whether the process start signal from the frequency multiplier/demultiplier 13 is sent to the counter 118. In the above description, the method of controlling the PLL 111 and the counter 118 of the first embodiment of the present invention has been described in addition to the method of generating the processing-start signal of the phase difference detector 112 of the present embodiment.

2. Conclusion

As described above, according to the embodiment of the present invention, the number of phase difference detectors (including the phase detectors and the loop filters), which have been typically installed in a plurality of synchronization-holding channels existing in the art, can be reduced and the processing of a plurality of synchronization-holding channel channels can be performed using one phase different difference detector with time sharing. A reduction in the number of phase difference detectors, which have been installed in each of plural synchronization-holding channels, can be attained. Thus, even if the number of the synchronization-holding channels increases, it is possible to contribute a reduction in cycle size and a reduction in power consumption.

Furthermore, in any of the embodiments of the present invention, a method of synchronization holding or synchronization acquisition of satellites is not assumed to be realized in any specific embodiment. It may be a synchronization acquiring unit and/or a synchronization-holding channel unit to be installed in a GPS receiver. In addition, various kinds of the processing described in the present embodiment may be sequentially carried out by allowing the CPU 26 to read any computer executable instructions stored in the memory 29 or the like.

The present application contains subject matter related to that disclosed in Japanese Priority Patent Application JP 2009-152472 filed in the Japan Patent Office on Jun. 26, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A signal receiver comprising:
an input that receives a plurality of signals from a respective plurality of channels;
a multiplexer unit that receives the plurality of signals from the input and that selects, in a time-division manner, one of the plurality of signals; and
at least one phase difference detector that receives the selected signal from the multiplexer unit, a number of the at least one phase difference detectors being less than a number of the plurality of channels.

2. A signal receiver according to claim 1, wherein each of the at least one phase difference detector includes a phase detector and a loop filter.

3. A signal receiver according to claim 1, wherein the multiplexer unit includes a first multiplexer that selects an I signal from I signals from the respective plurality of channels and a second multiplexer that selects a Q signal from Q signals from the respective plurality of channels.

4. A signal receiver according to claim 1, further comprising:
a carrier numerically controlled oscillator (NCO) that receives an output from the at least one phase difference detector.

5. A signal receiver according to claim 1, further comprising:
a counter that holds a channel number used by the multiplexer unit to select the one of the plurality of signals corresponding to the held channel number.

6. A signal receiver according to claim 1,
wherein a number of the plurality of channels is N, a time for processing the selected signal for one respective channel in the at least one phase difference detector is $T_1$, an interval between processing of selected signals in the at least one phase difference detector is $T_0$, and the number of the at least one phase difference detectors is M,
wherein $$M = \left\lceil \frac{N}{L} \right\rceil, \text{ and}$$

$$L = \left\lfloor \frac{T_0}{T_1} \right\rfloor,$$

wherein $\lfloor \ \rfloor$ indicates a floor function symbol in which $\lfloor x \rfloor$ is the maximum integer that does not exceed x, and wherein ⌈ ⌉ indicates a ceiling function symbol in which ⌈X⌉ is the minimum integer that does not exceed x.

7. A signal receiving method comprising:
  receiving, at an input, a plurality of signals from a respective plurality of channels;
  selecting, at a multiplexer unit that receives the plurality of signals from the input, one of the plurality of signals in a time-division manner; and
  performing at least one phase difference detection, by a phase difference detector, on the selected signal from the selecting at the multiplexer unit, a number of the at least one phase difference detectors being less than a number of the plurality of channels.

8. A signal receiving method according to claim 7, wherein the performing the phase difference detecting includes performing a phase detection and performing a loop filtering.

9. A signal receiving method according to claim 7, wherein the selecting includes a first selecting an I signal from I signals from the respective plurality of channels and a second selecting a Q signal from Q signals from the respective plurality of channels.

10. A signal receiving method according to claim 7, further comprising:
  carrier numerically controlled oscillating an output from the performing the phase difference detection at the at least one phase difference detector.

11. A signal receiving method according to claim 7, further comprising:
  holding a channel number, and using the held channel number in the selecting to select the one of the plurality of signals corresponding to the held channel number.

12. A signal receiving method according to claim 7,
  wherein in the performing phase difference detection, a number of the plurality of channels is N, a time for processing the selected signal for one respective channel in the at least one phase difference detector is $T_1$, an interval between processing of selected signals in the at least one phase difference detector is $T_0$, and
  the number of the at least one phase difference detectors is M,
  wherein $$M = \left\lceil \frac{N}{L} \right\rceil, \text{ and}$$

$$L = \left\lfloor \frac{T_0}{T_1} \right\rfloor,$$

wherein ⌊ ⌋ indicates a floor function symbol in which ⌊x⌋ is the maximum integer that does not exceed x, and
wherein ⌈ ⌉ indicates a ceiling function symbol in which ⌈X⌉ is the minimum integer that does not exceed x.

13. A global positioning system (GPS) device comprising:
  a frequency converter that receives a plurality of GPS signals from a respective plurality of global positioning systems;
  a synchronization holding circuit that holds specific of the GPS signals, and comprising:
    a multiplexer unit that receives the plurality of signals from the frequency converter and that selects, in a time-division manner, one of the plurality of signals; and
    at least one phase difference detector that receives the selected signal from the multiplexer unit, a number of the at least one phase difference detectors being less than a number of the plurality of channels.

14. A GPS device according to claim 13, wherein each of the at least one phase difference detector includes a phase detector and a loop filter.

15. A GPS device according to claim 13, wherein the multiplexer unit includes a first multiplexer that selects an I signal from I signals from the respective plurality of channels and a second multiplexer that selects a Q signal from Q signals from the respective plurality of channels.

16. A GPS device according to claim 13, the synchronization holding circuit further comprising:
  a carrier numerically controlled oscillator (NCO) that receives an output from the at least one phase difference detector.

17. A GPS device according to claim 13, the synchronization holding circuit further comprising:
  a counter that holds a channel number used by the multiplexer unit to select the one of the plurality of signals corresponding to the held channel number.

18. A GPS device according to claim 13,
  wherein a number of the plurality of channels is N, a time for processing that selected signal for one respective channel in the at least one phase difference detector is $T_1$, an interval between processing of selected signals in the at least one phase difference detector is $T_0$, and
  the number of the at least one phase difference detectors is M,
  wherein $$M = \left\lceil \frac{N}{L} \right\rceil, \text{ and}$$

$$L = \left\lfloor \frac{T_0}{T_1} \right\rfloor,$$

wherein ⌊ ⌋ indicates a floor function symbol in which ⌊x⌋ is the maximum integer that does not exceed x, and
wherein ⌈ ⌉ indicates a ceiling function symbol in which ⌈X⌉ is the minimum integer that does not exceed x.

19. A signal receiver comprising:
  means for receiving a plurality of signals from a respective plurality of channels;
  means for selecting, from the plurality of signals from the means for receiving, in a time-division manner, one of the plurality of signals; and
  at least one means for detecting a phase difference of the selected signal from the means for selecting, a number of the at least one means for detecting a phase difference being less than a number of the plurality of channels.

20. A signal receiver according to claim 19, further comprising:
  means for carrier numerically controlled oscillating an output from the at least one means for detecting a phase difference.

21. A signal receiver according to claim 19, further comprising:
  means for holding a channel number used by the means for selecting to select the one of the plurality of signals corresponding to the held channel number.

* * * * *